United States Patent [19]
Pujari et al.

[11] Patent Number: 5,908,796
[45] Date of Patent: Jun. 1, 1999

[54] DENSE SILICON NITRIDE CERAMIC HAVING FINE GRAINED TITANIUM CARBIDE

[75] Inventors: Vimal Pujari, Northboro; William Collins, Auburn, both of Mass.

[73] Assignee: Saint-Gobain Industrial Ceramics, Inc., Worcester, Mass.

[21] Appl. No.: 09/071,095

[22] Filed: May 1, 1998

[51] Int. Cl.[6] .................................................. C04B 35/584
[52] U.S. Cl. ............................. 501/97.1; 501/87; 501/97.4
[58] Field of Search ........................... 501/87, 97.1, 97.2, 501/97.3, 97.4

[56] References Cited

U.S. PATENT DOCUMENTS

| | | | |
|---|---|---|---|
| 3,833,389 | 9/1974 | Komeya et al. | 106/55 |
| 3,836,374 | 9/1974 | Richerson et al. | 106/55 |
| 3,911,188 | 10/1975 | Torti, Jr. et al. | 428/218 |
| 3,926,857 | 12/1975 | Matkin et al. | 252/516 |
| 4,145,224 | 3/1979 | Mehalchick et al. | 501/97.1 |
| 4,216,021 | 8/1980 | Hattori et al. | 106/73.2 |
| 4,322,249 | 3/1982 | Claussen et al. | 501/88 |
| 4,335,217 | 6/1982 | Hatta et al. | 501/92 |
| 4,469,801 | 9/1984 | Hirai et al. | 501/97.1 |
| 4,521,525 | 6/1985 | Hsieh | 501/97.2 |
| 4,613,455 | 9/1986 | Suzuki et al. | 501/97.2 |
| 4,628,039 | 12/1986 | Mizutani et al. | 501/97.2 |
| 4,764,490 | 8/1988 | Yamakawa et al. | 501/97 |
| 4,800,180 | 1/1989 | McAllister et al. | 501/88 |
| 4,800,182 | 1/1989 | Izaki et al. | 501/92 |
| 5,002,907 | 3/1991 | Hayakawa et al. | 501/97 |
| 5,098,872 | 3/1992 | Suyama et al. | 501/97 |
| 5,145,620 | 9/1992 | Sakai et al. | 264/65 |
| 5,177,038 | 1/1993 | Takahaski et al. | 501/92 |
| 5,194,201 | 3/1993 | Miwa et al. | 264/56 |
| 5,352,641 | 10/1994 | Matsui et al. | 501/92 |
| 5,384,292 | 1/1995 | Matsui et al. | 501/97.4 |
| 5,424,256 | 6/1995 | Yoshimura et al. | 501/97.3 |
| 5,432,132 | 7/1995 | Dasgupta et al. | 501/97.2 |
| 5,439,856 | 8/1995 | Komatsu | 501/97.2 |
| 5,575,571 | 11/1996 | Takebayashi et al. | 384/492 |
| 5,744,410 | 4/1998 | Komatsu et al. | 501/97.2 |

FOREIGN PATENT DOCUMENTS

| | | | |
|---|---|---|---|
| 6-172034 | 6/1994 | Japan | C04B 35/58 |

OTHER PUBLICATIONS

Sergej T. Buljan, J. Gary Baldoni and Marvin L. Huckabee, "$Si_3N_4$–SiC Composites", Am. Ceram. Soc. Bull., 66 [2], 1987. Pp. 347–352 (no month).

F. F. Lange, "Effect of Microstructure on Strength of $Si_3N_4$–SiC Composite System", Journal of The American Ceramic Society, vol. 56., No. 9, Sep. 1973, pp. 445–450.

T. Mah, M. G. Mendiratta and H. A. Lipsitt, "Fracture Toughness and Strength of $Si_3N_4$–TiC Composites", Ceramic Bulletin, vol. 60, No. 11, 1981, pp. 1229–1231, 1240 (no month).

*Primary Examiner*—Michael Marcheschi
*Attorney, Agent, or Firm*—Thomas M. DiMauro

[57] ABSTRACT

This invention relates to a sintered silicon nitride ceramic material comprising:

a) at least 80 wt % silicon nitride grains, and b) between 0.1 and 5 wt % additive grains characterized by at least one of:

i) a Knoop hardness of at least 25 GPa, ii) a coefficient of thermal expansion of at least $6 \times 10^{-6}$/K, and iii) a modulus of elasticity of at least 600 GPa, wherein the maximum detectable grain size of the additive grains is no more than 4 um, as determined by a photomicrograph of a polished 75 mm$^2$ microstructure of the silicon nitride material.

10 Claims, No Drawings

DENSE SILICON NITRIDE CERAMIC HAVING FINE GRAINED TITANIUM CARBIDE

BACKGROUND OF THE INVENTION

Silicon nitride has been used in wear and high temperature applications such as bearings and valves for internal combustion engines.

JP Published Patent Application No. (Kokai) 6-172034 reports that adding titanium carbide (TiC) to a silicon nitride green body imparts a black color to the densified silicon nitride material. As the color of a conventional densified silicon nitride material can be various shades of gray, the coloring achieved by adding TiC provides the desirable visual appearance of a more uniform, more consistent material. The average particle size of the TiC powder reported in JP 6-172034 was about one micron. Replication of one of the Examples therein produced a silicon nitride material whose maximum detectable TiC grain size was over 5.5 um, and whose $D_{50}$ TiC grain size was about 1.36 um.

One commercial silicon nitride bearing material also contains a small amount of TiC. Analysis of a 75 mm² polished microstructure of this material reveals that its largest detectable TiC grain was about 5.25 um, and its $D_{50}$ TiC grain size was about 0.793 um.

SUMMARY OF THE INVENTION

It has been unexpectedly found that reducing the maximum detectable TiC grain size in a silicon nitride bearing material not only increased the material's flexural strength and rolling contact fatigue ("RCF") life, but also dramatically decreased its wear rate. In particular, the $L_{10}$ RCF life (as determined by ASTM STP 771 at 6.4 GPa) of a sinter-hipped silicon nitride bearing material comprising about 0.5 wt % TiC was found to increase from 5 to 70 million cycles when the maximum detectable TiC grain size was reduced from about 4.8 um to 2.3 um. Likewise, the wear rate of these same silicon nitride materials decreased from 300 um³/km to 30 um/km. Lastly, the mean four-point flexural strength of the material increased from about 750 MPa to about 950 MPa.

Since the $D_{50}$ of the TiC grains in the material of the present invention was about 0.87 um (using a 0.378 um cutoff), and so was about the same as the TiC $D_{50}$ in both the commercial silicon nitride material and the comparative example, it is believed the superior properties of the present invention can be attributed to the reduction in the maximum detectable TiC grain size.

The dramatic increase in flexural strength brought on by the reduction in maximum TiC grain size is surprising in light of the relatively small size of the TiC grains present in the conventional materials. In particular, not only were the $D_{50}$'s of the TiC grains in conventional materials about the same size as their neighboring silicon nitride grains, but also the maximum detectable TiC grains (only about 5 um) in these conventional materials were also much smaller than typical flaw sizes in conventional silicon nitride materials (about 20–50 um).

In addition, the beneficial effect of reducing the maximum detectable TiC grain size is suprising in light of conventional teachings regarding the effect of carbide additions to a $Si_3N_4$ matrix. As discussed in Buljan et al., *Amer. Cer. Soc. Bulletin*, 66(2) 347–52 (1987) at page 349, coarser SiC additions (8 um) were found to improve the silicon nitride's mechanical properties while finer additions (0.5 um) reduced its toughness. Buljan concludes that the addition of coarse SiC with a size larger than the matrix $Si_3N_4$ grains would be expected to increase the toughness of the composite. Likewise, see Lange, *J. Amer. Cer. Soc.* 56(9) 445–50 (1973).

It is believed the reason why TiC grains do not act like SiC grains in the $Si_3N_4$ matrix lies in their significantly different thermal expansion coefficient ("CTE") and hardness values. Approximate values for these materials are provided in Table I below:

TABLE I

| | Coefficient of Thermal Expansion ($10^{-6}$/K) | Modulus of Elasticity (GPa) | Knoop Hardness (GPa) |
| --- | --- | --- | --- |
| $Si_3N_4$ | 3 | 304 | 15 |
| SiC | 4.3–5.6 | 200–500 | 22 |
| TiC | 8 | 430 | 28 |
| TaC | 6.7 | 285 | 16–24 |
| TiN | 8 | 251 | 16–20 |
| WC | 5 | 700 | 32 |

Further examination of Table I reveals that, while the CTE and hardness values of $Si_3N_4$ and SiC materials are somewhat different, there is a much more significant difference between the CTE and hardness values of $Si_3N_4$ and TiC.

Without wishing to be tied to a theory, it is believed that the significant difference in thermal expansion coefficient (coupled with a 30*% difference in modulus of elasticity) between the $Si_3N_4$ and TiC grains cause stress concentrations around the larger TiC grains during the cooling of the densified $Si_3N_4$ material after densification, leading to lower flexural strength. Simply, the sphere of influence of the stress caused by the TiC grain is much larger than the grain itself. In contrast, the SiC grain will have a much smaller sphere of influence in a $Si_3N_4$ matrix. Eliminating the largest TiC grains from the silicon nitride material reduced the effect of these differences, and thereby reduced the sphere of influence of stress concentrations and increased the flexural strength of the $Si_3N_4$ material.

Regarding hardness, it was thought that the higher hardness of the TiC material would cause it to act as a crack deflector, and thereby improve the toughness and strength of the silicon nitride material, leading to a higher RCF life. For example, U.S. Pat. No. 5,098,782 ("Suyama") teaches that 0.1–5 wt % of TiN reinforces the grain boundary of the silicon nitride material. See Suyama at col. 4, lines 13–15. Accordingly, it was believed that decreasing the TiC grain size would lessen the reinforcing effect, and thereby degrade the strength, toughness and RCF life of the material. However, the opposite effect was observed. Accordingly, the increased RCF life of the fine TiC-grained material of the present invention is also surprising in light of conventional wisdom respecting the role of hardness.

Respecting the improved wear life of the material of the present invention, it is believed that the extreme higher hardness of TiC (28 GPa) as compared to silicon nitride (15 GPa) leads to non-uniform wearing on the surface of the bearing material, resulting in the largest TiC grains substantially protruding from the surface of an otherwise substantially uniformly worn silicon nitride. During rolling contact, these high hardness protrusions cause the ceramic surface to act as a mini-grinding wheel upon the race, thereby raising the friction coefficient of the couple. The higher friction coefficient is believed to lead to a high rate of wear (as there is a greater tangential force on the bearing surface) and a lower RCF life (as the increased wear increases the probability of spalling). Eliminating the largest TiC grains from the silicon nitride material lessens the extent of TiC protrusion and abates this grinding wheel effect, leading to increased RCF life and lower wear.

Accordingly, it is believed that reducing the maximum detectable grain size of any additive in a silicon nitride bearing material will likewise lead to an increased RCF life when that additive has at least one of:

a) a much higher CTE, b) and much higher modulus of elasticity ("MOE"), or c) a much higher hardness.

Therefore, in accordance with the present invention, there is provided a sintered silicon nitride ceramic material comprising:

a) at least 80 wt % silicon nitride grains, and b) between 0.1 and 5 wt % additive grains having at least one of:

i) a Knoop hardness of at least 25 GPa (under a load of 500 g), ii) a coefficient of thermal expansion of at least $6 \times 10^{-6}$/K (as measured from 22–700° C.) and iii) a modulus of elasticity of at least 600 GPa, wherein the maximum detectable grain size of the additive grains is no more than 4 um (reported in two-dimensions), as determined by a photomicrograph of a polished 75 mm$^2$ microstructure of the silicon nitride material.

DETAILED DESCRIPTION OF THE INVENTION

Although TiC is preferred as an additive because it provides the desirable coloring effect, any additive having one of the three above-noted characteristics is contemplated as within the scope of the present invention. For example, controlling the maximum grain size of carbide additives such as TaC and WC, and nitride additives such as TiN should also produce the desired benefits.

In some embodiments, the additive grain has a coefficient of thermal expansion of at least $7 \times 10^{-6}$/K.

When TiC is selected as the additive, it is typically added as a powder to the raw batch containing silicon nitride powder and conventional sintering aid powders. If the TiC starting powder has an undesirably high particle size, the powder can be milled to a more appropriate size. For example, a starting TiC powder having a $D_{50}$ of about 4 um and a $D_{90}$ of about 4.5 um can be subjected to milling in a ball or attrition mill with silicon nitride media for about 4 to 8 hours to produce a milled TiC powder having a $D_{50}$ particle size of about 0.3 um and a $D_{90}$ particle size of about 0.8 um.

Preferably, the additive powder added to the raw batch has a $D_{50}$ particle size of between about 0.2 and 0.3 um, and a $D_{90}$ particle size of less than 1.0 um, typically between about 0.6 um and 0.8 um. If the additive particle size rises above this $D_{90}$ value, then at least the grinding wheel effect may be observed during use of the sintered product. Therefore, also in accordance with the present invention, there is provided a raw batch comprising ceramic powders, the ceramic powders comprising:

a) at least 80 wt % silicon nitride powder, and b) between 0.1 and 5 wt % additive powder having at least one of:

i) a Knoop hardness of at least 25 GPa (under a load of 500 g), ii) a coefficient of thermal expansion of at least $6 \times 10^{-6}$/K (as measured from 22–700° C.) and iii) a modulus of elasticity of at least 600 GPa, wherein the additive powder has a $D_{90}$ of no more than 1.0 um. Preferably, the additive powder is TIC.

Preferably, the silicon nitride powder of the raw batch is in the alpha form, has a $D_{50}$ particle size of between about 0.4 um and 0.7 um, and a $D_{90}$ particle size of between about 1.0 and 1.2 um. If the $D_{50}$ particle size rises above this range, then sinterability and strength are degraded. If the $D_{50}$ particle size falls below this range, then the densified material will likely have a relatively fine microstructure and an inherently lower fracture toughness. In preferred embodiments, the starting silicon nitride powder is SNE10, marketed by Ube Industries, NY, N.Y.

Conventional sintering aids in conventional amounts are contemplated as being used in accordance with the present invention to help densify the green body. In some embodiments which densify the green body by sinter-hipping, the green body comprises between about 5.1 wt % and 15 wt % total rare earth oxide. Preferably, it comprises between about 5.1 wt % and 10 wt %, and more preferably between about 5.5 wt % and 8 wt % total rare earth oxide. In some preferred embodiments, the green body comprises between 2 wt % and 3 wt % alumina, and, optionally, between 0.8 wt % and 1.0 wt % aluminum nitride. Preferably, the green body comprises between about 3 wt % and 3.5 wt %, yttria, between about 4 wt % and 5 wt % neodymia, between 0.8 wt % and 1.0 wt % aluminum nitride, and between 2 wt % and 3 wt % alumina.

In some embodiments made via sinter-hip processing, the powder processing may need to be carefully controlled in order to achieve a fully dense (i.e., at least 99.9% of theoretical density) product. In particular, the sintering aids may need to be milled to very fine levels (i.e., at least about 30 m$^2$/g) and the milled sintering aids may need to be dispersed in the liquid media of the raw batch prior to dispersion of the silicon nitride powder therein. Requiring the fine-sized sintering aids allows the sintering aids to be homogeneously distributed throughout the raw batch (and assists full densification), while adding these aids to the media before the silicon nitride is added thereto prevents the sintering aids from agglomerating.

In some embodiments wherein the silicon nitride green body is densified by a sinter-hip process, the silicon nitride green body is first sintered to at least about 97% of theoretical density and then hipped to at least 99.9% of theoretical density. The sintering step is usually includes a 60 to 120 minute soak cycle at between 1750° C. and 1780° C. in a 1–2 atm nitrogen atmosphere. The hipping step is usually includes a 60 to 120 minute soak cycle at between 1800° C. to 1850° C. in a 1000–2000 atm nitrogen atmosphere.

The fully dense silicon nitride body typically contains at least about 80 wt % (preferably at least 85 wt %) silicon nitride. Its density should be at least 99% and preferably at least 99.9% of theoretical density. The grain size of the silicon nitride is typically characterized by a $D_{50}$ of between about 0.3 um to 0.7 um, and a $D_{90}$ of between about 1.8 um and 2.1 um.

The fully dense ceramic further comprises between 0.1 wt % and 5 wt % additive grains. In preferred embodiments, the additive grain comprises between 0.25 wt % and 1 wt % of the dense material. If more than 1 wt % is used, then RCF life and flexural strength may be degraded. If less than 0.25 wt % is used and the additive grain is TiC, then the coloration effect is limited and the material appears to have a non-uniform microstructure. The maximum detectable grain size of the additive (preferably TiC) is preferably no more than 3 um, more preferably no more than 2 um. The average $D_{50}$ grain size of the additive is preferably between 0.3 and 1.5 um, more preferably between 0.3 and 1.0 um.

In preferred embodiments, the fully dense silicon nitride material further comprises between about 5.1 wt % and 10 wt % total rare earth, as rare earth oxide. Preferably, it comprises between about 5.5 wt % and 8 wt % total rare earth, as rare earth oxide. In some preferred embodiments, the dense material further comprises between 2 wt % to 3 wt % aluminum (as alumina), and, optionally, between 0.8 and 1.0 wt % aluminum nitride.

When subjected to rolling contact fatigue testing, such as ASTM STP 771 at 6.4 GPa hertzian contact stress, the silicon nitride material of the present invention exhibits a higher fatigue life than a comparable material having about twice the maximum detectable TiC grain size. Whereas the RCF life of the silicon nitride of the present invention was found to be over 70 million cycles, the RCF life of the more coarse TiC grained silicon nitride was found to be less than 10 million cycles.

Moreover, the silicon nitride material also displayed much less wear (i.e., a level of only about one-tenth that of the comparable material having the more coarse TiC grains). In particular, the wear rate was only 30 $um^3/km$, as compared to 300 $um^3/km$ for the comparable coarse TiC grained silicon nitride.

The silicon nitride of the present invention may be used in a number of conventional ceramic applications, including but not limited to, bearing balls of a substantially spherical shape, ball bearings, roller bearings, plain sliding bearings and other structural or wear applications. Preferably, the silicon nitride material of the present invention can be advantageously used in rolling contact applications, particularly where the rolling contact fatigue is expected to be appreciable. In these applications, the material should have a surface roughness Ra of no more than about 0.05 um and be essentially spherical in shape. It also can be advantageously used in sliding applications where the wear rate of the ceramic is a concern. In these applications, the material should have a surface roughness Ra of no more than about 0.05 um.

As it is believed that the discoveries presented above are applicable to ceramic materials in general, then also in accordance with the present invention, there is provided a sintered ceramic material comprising:

a) at least 80 wt % grains of a first phase material characterized by a first Knoop hardness, a first coefficient of thermal expansion, and a first modulus of elasticity, and b) between 0.1 and 5 wt % grains of a second phase material, wherein the second phase material is characterized by at least one of:

i) a second Knoop hardness being at least 50% greater than that of the first phase material, ii) a second coefficient of thermal expansion being at least 100% greater than that of the first phase material, iii) a second modulus of elasticity being at least 100% greater than that of the first phase material, wherein the maximum detectable grain size of the second phase material is no more than 4 um, as determined in two dimensions by a photomicrograph of a polished 75 $mm^2$ microstructure of the material.

Preferably, the second phase material is characterized by a second coefficient of thermal expansion being at least 100% greater than that of the first phase material. Also preferably, the first phase material is preferably a nitride or a carbide (more preferably a nitride) and the second phase material is preferably a nitride or a carbide (more preferably a carbide).

EXAMPLE I

In this example, the starting TiC powder has been milled to produce a $D_{50}$ of about 0.3 um and a $D_{90}$ of about 0.8 um.

Selected sintering aid components of yttria, neodymia, alumina, aluminum nitride and TiC were dispersed in a liquid medium and pre-milled to reduce to particle size of the aid powders from about 13 $m^2/g$ to about 45 $m^2/g$. Next, E10 alpha-silicon nitride powder was added to the dispersion to produce a mixture having about 3.1 wt % yttria, about 4.6 wt % neodymia, about 2.6 wt % alumina, about 1.0 wt % aluminum nitride, and about 0.5 wt % TiC. The mixture was then mixed for four hours in deionized water by an attrition mill having silicon nitride milling media. A dispersant system and a binder were also present in the mill. The silicon nitride in the mixture had an average particle size of about 12–13 $M^2/g$. The mixture appeared homogeneous and contained no visible agglomeration.

The resulting slurry was spray-dried, screened through 60 mesh and then 140 mesh screens, and then cold pressed into tiles. The tiles were cold isostatically pressed at 30,000 psi and then air fired at about 650° C.

Next, the green bodies were placed in RBSN crucibles housed in a batch-type furnace having graphite heating elements, and silicon nitride powder filled the remaining space in the crucibles. The temperature of the furnace was increased at a rate of between 10° C. and 15° C. per minute until 1780° C. was reached. The green bodies were then sintered at 1780° C. for 2 hours under a nitrogen pressure of about 20 psi to produce a density of 98.2% of theoretical density.

Next, the sintered bodies were hipped at 1800° C. for 1 hour under 200 MPa nitrogen pressure conditions. Upon completion of the hot isostatic pressing step, the furnace was shut down and the ceramics cooled. The densification cycle resulted in both low flaw size (no more than about 20 um) and full density (at least about 99.9% of theoretical density).

The microstructure of the densified ceramic was characterized by a crystalline silicon nitride phase consisting essentially of beta silicon nitride and an amorphous glass grain boundary phase. The beta silicon nitride grains had a $D_{50}$ thickness of between about 0.5 um and 0.625 um, and a $D_{90}$ thickness of about 0.75 um. The TiC was characterized by a maximum detectable grain size of about 2.3 um, and a $D_{50}$ of about 0.87 um.

The resulting ceramics were measured for hardness. Knoop hardness from 500 g loads were found to be about 14 GPa.

Fracture toughness was determined by the fracture of 4 point bend specimens of 3×4×50 mm containing a Vickers indentation (10 kg load) on the tensile surfaces within the inner span, at a crosshead speed of about 0.5 mm/min, according to procedures described by P. Chantikul et al., in "A Critical Evaluation of Indentation Techniques for Measuring Fracture Toughness II: Strength Methods", *J. Am. Ceram. Soc.* 64(9), pp. 539–544 (1981). The average toughness of the ceramic of the present invention was about 7 MPa m½.

The 4-point flexure strength of the ceramics of the present invention were also determined. 3×4×50 mm type B specimens on a 40 mm outer span and a 20 mm inner span test jig (ASTM C1161-90) were selected. The mean four point flexural strength was determined to be about 950 MPa. The Weibull modulus thereof was found to be about 20.

The densified material was also shaped into RCF rods and subjected to RCF testing, specifically the accelerated bearing test procedure described in ASTM-STP 771. This test procedure applies contact pressure higher than that normally encountered in service in order to accelerate the fatigue failure of the test material. The test uses statistical analysis of data from numerous test specimens, and the results are normally reported in terms of a variable $L_x$, which denotes the number of stress cycles which cause failure in X percent of the specimens tested at a given stress level. In carrying out the RCF test for the present invention, three slave balls made of AISI 52100 steel were loaded against a rod consisting of the silicon nitride of the present invention at an average hertzian contact stress of about 6.4 GPa. The rod was rotated at about 3600 rpm with an electric motor. Both the slave balls and the rod were lubricated with lubricating oil supplied by a drip feeder at a rate of about 8 drops per minute. The test produced circumferential fatigue grooves in the rod which were about 2 um to 7 um in depth. The silicon nitride of the present invention displayed normal failure modes and uniform wear. Eight different sections of a single test rod of the present invention were sequentially subjected to RCF testing, and the first failure occurred at about 70 million cycles. If a Weibull slope of about 0.74 is assumed (i.e., it is assumed the present invention has the same failure mechanism as conventional bearing quality silicon nitrides), an $L_{10}$ of about 70 million cycles is realized for the present invention.

Wear testing was conducted by measuring the depth of the grooves and calculating the amount of material removed per distance traveled. The wear rate was calculated to be about 30 um$^3$/km.

COMPARATIVE EXAMPLE I

This comparative Example examines the effect of maximum detectable TiC grain size upon the mechanical properties and rolling contact performance of a silicon nitride bearing.

A silicon nitride green body was prepared and sinter-hipped in a manner substantially similar to that of Example I, except that the starting TiC powder had an average $D_{50}$ particle size of about 1.7 um and a $D_{90}$ of about 4 um.

The material was densified to a density of at least about 99.9% of theoretical density. The $D_{50}$ grain size of the TiC grains in the resulting microstructure was about 1 um, while the maximum detectable TiC grain size was about 4.85 um.

The fully dense material was tested for mechanical properties, RCF life and wear, as in Example I above.

It was also observed that, upon completion of the RCF test, the silicon nitride material was extremely hot to the touch, and considerable wear was observed on the steel balls.

The superior mechanical characteristics of the present invention as exemplified by Example I are summarized in Table II below and then compared to the comparable characteristics of the coarse TiC containing silicon nitride ceramic described in Comparative Example I. These results demonstrate the criticality of controlling the maximum detectable grain size of the TiC additive.

TABLE II

| PROPERTY | EXAMPLE I | COMPARATIVE EXAMPLE |
|---|---|---|
| $L_{10}$ RCF Life (million cycles) | 70 | 5 |
| Wear Rate (um$^3$/km) | 30 | 300 |
| Flexural strength (MPa) | 950 | 750 |
| Mean TiC grain size (um) | 0.87 | 1.02 |
| Maximum TiC grain size (um) | 2.3 | 4.8 | we claim:

1. A sintered silicon nitride ceramic material comprising:

a) at least 80 wt % silicon nitride crystal grains and b) between 0.25 wt, and 1 wt % additive grains wherein the additives grains are selected from the group consisting of TiC, WC and TaC, and wherein the maximum detectable grain size of the additive grains is no more than 4 um, as determined by a photomicrograph of a polished 75 mm$^2$ microstructure of the silicon nitride material.

2. The material of claim 1 wherein the maximum detectable grain size of the additive grains is no more than 3 um.

3. The material of claim 1 wherein the additive grains are WC.

4. The material of claim 3 wherein the maximum detectable grain size of the additive grains is no more than 3 um.

5. The material of claim 1 wherein the additive grains are TaC.

6. The material of claim 5 wherein the maximum detectable grain size of the additive grains is no more than 3 um.

7. The material of claim 1 wherein the additive grains are TiC.

8. The material of claim 7 wherein the maximum detectable grain size of the additive grains is no more than 3 um.

9. The material of claim 1 wherein the additive grains are characterized by a $D_{50}$ of between 0.3 and 1.5 um.

10. The material of claim 1 Wherein the additive grains are characterized by a $D_{50}$ of between 0.3 and 1.0 um.

* * * * *